United States Patent
Sekine et al.

(10) Patent No.: US 10,827,559 B2
(45) Date of Patent: Nov. 3, 2020

(54) BASE STATION SYSTEM

(71) Applicant: NEC Corporation, Tokyo (JP)

(72) Inventors: Genichiro Sekine, Tokyo (JP); Ichiro Kaneko, Tokyo (JP); Katsumi Tanoue, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 16/712,709

(22) Filed: Dec. 12, 2019

(65) Prior Publication Data

US 2020/0120755 A1 Apr. 16, 2020

Related U.S. Application Data

(63) Continuation of application No. 16/022,364, filed on Jun. 28, 2018, now Pat. No. 10,517,143, which is a
(Continued)

(30) Foreign Application Priority Data

Feb. 10, 2012 (JP) ................................. 2012-027177

(51) Int. Cl.
*H04W 4/90* (2018.01)
*H04W 88/08* (2009.01)
(Continued)

(52) U.S. Cl.
CPC ........ *H04W 88/085* (2013.01); *H04B 1/3888* (2013.01); *H04W 88/08* (2013.01);
(Continued)

(58) Field of Classification Search
CPC .............................. H04W 16/18; H04W 92/00
(Continued)

(56) References Cited

U.S. PATENT DOCUMENTS 6,587,684 B1* 7/2003 Hsu .................... H04M 1/72525
370/328
7,366,553 B1 4/2008 Shields et al.
(Continued)

FOREIGN PATENT DOCUMENTS

CN   101365185 A   2/2009
CN   201278528 Y   7/2009
(Continued)

OTHER PUBLICATIONS

Office Action dated Nov. 19, 2015 by the Russian Patent Office in counterpart Russian Patent Application No. 2014132865/07(052920).
(Continued)

*Primary Examiner* — Thomas J Lett
(74) *Attorney, Agent, or Firm* — Finnegan, Henderson, Farabow, Garrett & Dunner, L.L.P.

(57) ABSTRACT

A base station system includes a base station device (1), a wireless transmission device (2) and a data transfer device (3), each of which can be installed outdoors. Enclosures (12, 22 and 32) of the devices (1-3) each provide a degree of protection from water and dust ingress necessary for being installed outdoors. The enclosure (12) of the base station device (1) accommodates electronic equipment (11) functioning as a base station. The enclosure (22) of the wireless transmission device (2) accommodates electronic equipment (21) functioning as a radio station to perform wireless transmission with the other device for connecting the base station device (1) to a mobile backhaul network. The enclosure (32) of the data transfer device (3) accommodates electronic equipment (31) functioning as a router or a switch to transfer data packets or data flames between the base station device (1) and the wireless transmission device (2).

(Continued)

This eliminates the need for construction of a building/shelter to install the base station system.

16 Claims, 3 Drawing Sheets

Related U.S. Application Data continuation of application No. 15/230,898, filed on Aug. 8, 2016, now Pat. No. 10,039,155, which is a continuation of application No. 14/377,571, filed as application No. PCT/JP2013/000537 on Jan. 31, 2013, now Pat. No. 9,439,241.

(51) Int. Cl.
*H04B 1/3888* (2015.01)
*H04W 84/04* (2009.01)
*H04B 1/38* (2015.01)

(52) U.S. Cl.
CPC ........ *H04B 2001/3894* (2013.01); *H04W 4/90* (2018.02); *H04W 84/047* (2013.01)

(58) Field of Classification Search
USPC .......................................................... 455/561
See application file for complete search history.

(56) References Cited

U.S. PATENT DOCUMENTS

| | | | |
|---|---|---|---|
| 7,372,705 B1* | 5/2008 | Spivey | H05K 7/20445 174/520 |
| 2003/0040335 A1 | 2/2003 | McIntosh et al. | |
| 2005/0113120 A1 | 5/2005 | Rappaport et al. | |
| 2007/0041426 A1 | 2/2007 | Hashimoto | |
| 2007/0127393 A1 | 6/2007 | Car | |
| 2009/0008232 A1 | 1/2009 | Dold | |
| 2009/0235139 A1 | 9/2009 | Park et al. | |
| 2010/0313757 A1 | 12/2010 | Crabtree et al. | |
| 2011/0259625 A1 | 10/2011 | Lin et al. | |
| 2011/0310881 A1 | 12/2011 | Kenington | |
| 2012/0177021 A1 | 7/2012 | Shipman | |

FOREIGN PATENT DOCUMENTS

| | | |
|---|---|---|
| CN | 101499829 A | 8/2009 |
| CN | 101938794 A | 1/2011 |
| EP | 1 404 024 A2 | 3/2004 |
| EP | 2 299 775 A1 | 3/2011 |
| JP | 10-107729 | 4/1998 |
| JP | 2001-197074 A | 7/2001 |
| JP | 2003-218547 | 7/2003 |
| JP | 2005-238970 | 9/2005 |
| JP | 2007-110479 A | 4/2007 |
| JP | 2009-106127 | 5/2009 |
| JP | 2010-129846 | 6/2010 |
| JP | 2011-49783 | 3/2011 |
| JP | 2011-91263 | 5/2011 |
| JP | 2011-165875 | 8/2011 |
| JP | 2011-193411 | 9/2011 |
| JP | 2011-238676 | 11/2011 |
| JP | 2012-10294 | 1/2012 |
| RU | 2 342 787 C1 | 12/2008 |
| RU | 2 407 150 C1 | 12/2010 |
| WO | WO 2004/028007 A1 | 4/2004 |
| WO | WO 2005/081459 A1 | 9/2005 |
| WO | WO 2007/144022 A1 | 12/2007 |
| WO | WO 2011/162281 A1 | 12/2011 |

OTHER PUBLICATIONS

Office Action dated Apr. 4, 2016, by the Russian Patent Office in counterpart Russian Patent Application No. 2014132865.

Extended European Search Report dated Oct. 30, 2015 by the European Patent Office in counterpart European Patent Application No. 13746606.6.

International Search Report dated Apr. 16, 2013.

Office Action issued by the Chinese Patent Office in counterpart Chinese Patent Application No. 201380008740.3, dated Mar. 23, 2015.

Decision to Grant a Patent dated Aug. 1, 2017, by the Japanese Patent Office in counterpart Japanese Patent Application No. 2013-557413.

Chinese Office Action dated Jul. 25, 2019, issued by the State Intellectual Property Office of People's Republic of China Patent Office in counterpart Chinese Patent Application No. 201610585840.8.

Notice of Reasons for Refusal dated Jul. 2, 2019, issued by the Japanese Patent Office in counterpart Japanese Patent Application No. 2018-160076.

Decision to Grant a Patent issued by the Japanese Patent Office in counterpart Japanese Patent Application No. 2017-163930, dated Jul. 31, 2018.

Wiborne, Inc. Outdoor High Power Waterproof Access Point Router for Base Station and CPE.

Inscape Data Corporation, Effective Deployment of Wireless Backhaul and base Station Systems (Jul. 20, 2005).

Non-final Office Action dated Jul. 10, 2017, USPTO, U.S. Appl. No. 15/230,898.

Office Action issued by the Indian Patent Office in counterpart Indian Patent Application No. 6009/CHENP/2014 dated Aug. 1, 2018.

Decision to Grant a Patent issued by the Japanese Patent Office in counterpart Japanese Patent Application No. 20018-160076, dated Jan. 7, 2020.

\* cited by examiner

US 10,827,559 B2

BASE STATION SYSTEM

CROSS-REFERENCE TO RELATED PATENT APPLICATIONS

This application is a continuation of U.S. patent application Ser. No. 16/022,364, filed Jun. 28, 2018, which is a continuation of U.S. patent application Ser. No. 15/230,898, filed Aug. 8, 2016 (now U.S. Pat. No. 10,039,155), which is a continuation of U.S. patent application Ser. No. 14/377,571, filed Aug. 8, 2014 (now U.S. Pat. No. 9,439,241), which is a National Stage Entry of International Application No. PCT/JP2013/000537, filed Jan. 31, 2013, which claims priority from Japanese Patent Application No. 2012-027177, filed Feb. 10, 2012. The entire contents of the above-referenced applications are expressly incorporated herein by reference.

TECHNICAL FIELD

The present invention relates to a base station system that includes a base station device, and a wireless transmission device and a data transfer device for connecting the base station device to a mobile backhaul network.

BACKGROUND ART

A wireless transmission system using microwaves or millimeter waves is generally used to connect a base station to a mobile backhaul network. Wireless connection between a base station and a mobile backhaul network has advantages over wired connection using optical fibers in easy network construction, high economic efficiency, and low constraints on the installation location of the base station.

A mobile backhaul network is an upper-level network to which a base station is connected. The mobile backhaul network includes, for example, a control node that performs signaling with a base station and a mobile station, a switching node that processes voice calls, and a transfer node that performs data transfer. Typically, the mobile backhaul network is managed by a mobile telecommunications carrier (a mobile operator). The mobile backhaul network includes a core network and, in some architecture, further includes a radio access network node. For example, in the case of UTRAN (UMTS Terrestrial Radio Access Network), the mobile backhaul network includes an RNC (Radio Network Controller) and a core network (e.g., a SGSN (Serving GPRS Support Node), a GGSN (Gateway GPRS Support Node), and an MSC (Mobile Switching Center)). Further, in the case of E-UTRAN (Evolved UTRAN), the mobile backhaul network includes a core network (e.g., an MME (Mobility Management Entity), an S-GW (Serving Gateway), and a P-GW (PDN Gateway)).

For example, Patent Literature 1 is known which describes a wireless transmission device for connecting a base station to a mobile backhaul network. Patent Literature 1 discloses a microwave wireless transmission device that includes an antenna and a front-end device (ODU: Outdoor Unit) installed outdoors and a back-end device (IDU: Indoor Unit) installed indoors. The front-end device (ODU) primarily performs analog signal processing such as frequency up/down conversion and amplification. The back-end device primarily performs digital signal processing such as channel coding/decoding, interleaving/deinterleaving, and modulation/demodulation.

CITATION LIST

Patent Literature

Patent Literature 1: International Patent Publication No. WO 2011/162281

SUMMARY OF INVENTION

Technical Problem

As described in Patent Literature 1, in the known wireless transmission device for connecting a base station to a mobile backhaul network, a part (i.e., the front-end) of the device is installed outdoors. However, the back-end device of the wireless transmission device is installed indoors (e.g., inside a building or a shelter). Further, the base station device is also installed indoors. Furthermore, a data transfer device (e.g., a router, a layer-3 switch or a layer-2 switch) is used to transfer data (e.g., IP (Internet Protocol) packets or MAC (Media Access Control) frames) between the base station and the wireless transmission device in some cases, and the data transfer device is also installed indoors.

The inventors of the present invention have made studies in order to more easily install a base station system that includes a base station device, and a wireless transmission device and a data transfer device for connecting the base station device to a mobile backhaul network. A base station system wirelessly connected to a mobile backhaul network does not require laying optical fibers but requires construction of a building/shelter for accommodating equipment needed to be installed indoors. Accordingly, base station facilities that do not require construction of a building/shelter are expected to be widely used in areas and countries under many geographical constraints. Further, base station facilities that do not require construction of a building/shelter are expected to contribute to quick restoration of a mobile phone infrastructure in the event of an emergency such as an earthquake or a flood.

The present invention has been accomplished based on the above-described findings by the inventors, and an object of the present invention is thus to provide a base station system (including a base station device, a wireless transmission device and a data transfer device) that does not require construction of a building/shelter.

Solution to Problem

According to an aspect of the present invention, a base station system includes a base station device, a wireless transmission device and a data transfer device, each of which is capable of being installed outdoors. The base station device includes first electronic equipment that functions as a base station to relay data between a plurality of mobile stations and a mobile backhaul network, and a first enclosure that accommodates the first electronic equipment. The wireless transmission device includes second electronic equipment that functions as a radio station to perform wireless transmission with another device for connecting the base station device to the mobile backhaul network, and a second enclosure that accommodates the second electronic equipment. The data transfer device includes third electronic equipment that functions as a router or a switch to transfer data packets or data flames between the base station device and the wireless transmission device, and a third enclosure that accommodates the third electronic equipment. Each of the first to third enclosures provides a degree of protection from water and dust ingress necessary for being installed outdoors.

Advantageous Effects of Invention

According to the aspect of the present invention described above, it is possible to provide a base station system (including a base station device, a wireless transmission device and a data transfer device) that does not require construction of a building/shelter.

DESCRIPTION OF EMBODIMENTS

Specific embodiments of the present invention will be described hereinafter in detail with reference to the drawings. It is noted that in the description of the drawings, the same elements will be denoted by the same reference symbols and redundant description will be omitted to clarify the explanation.

<First Embodiment>

Figure 1:
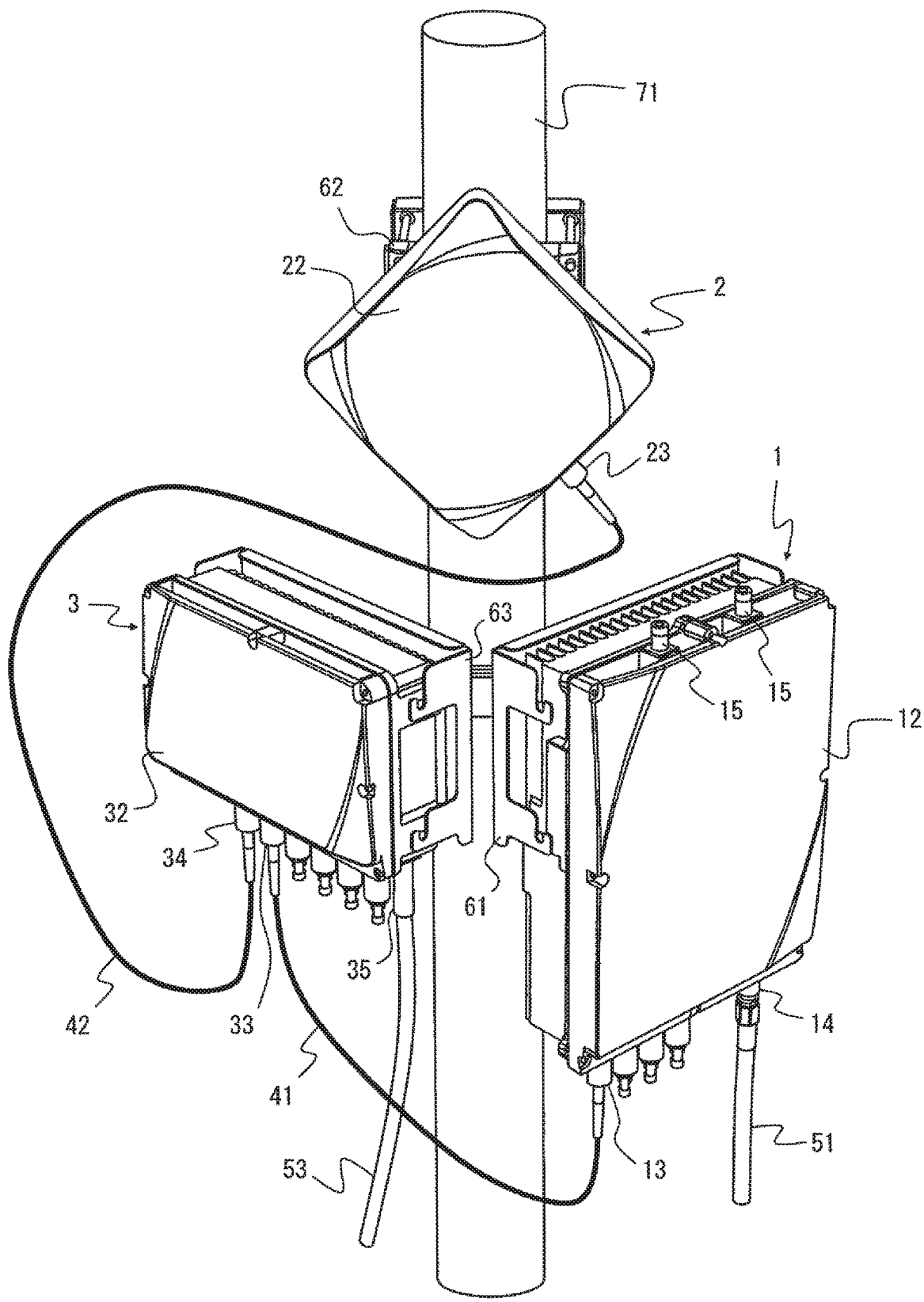
FIG. 1 is an external perspective view showing an external structure example and an installation example of a base station system according to a first embodiment.
Figure 2:
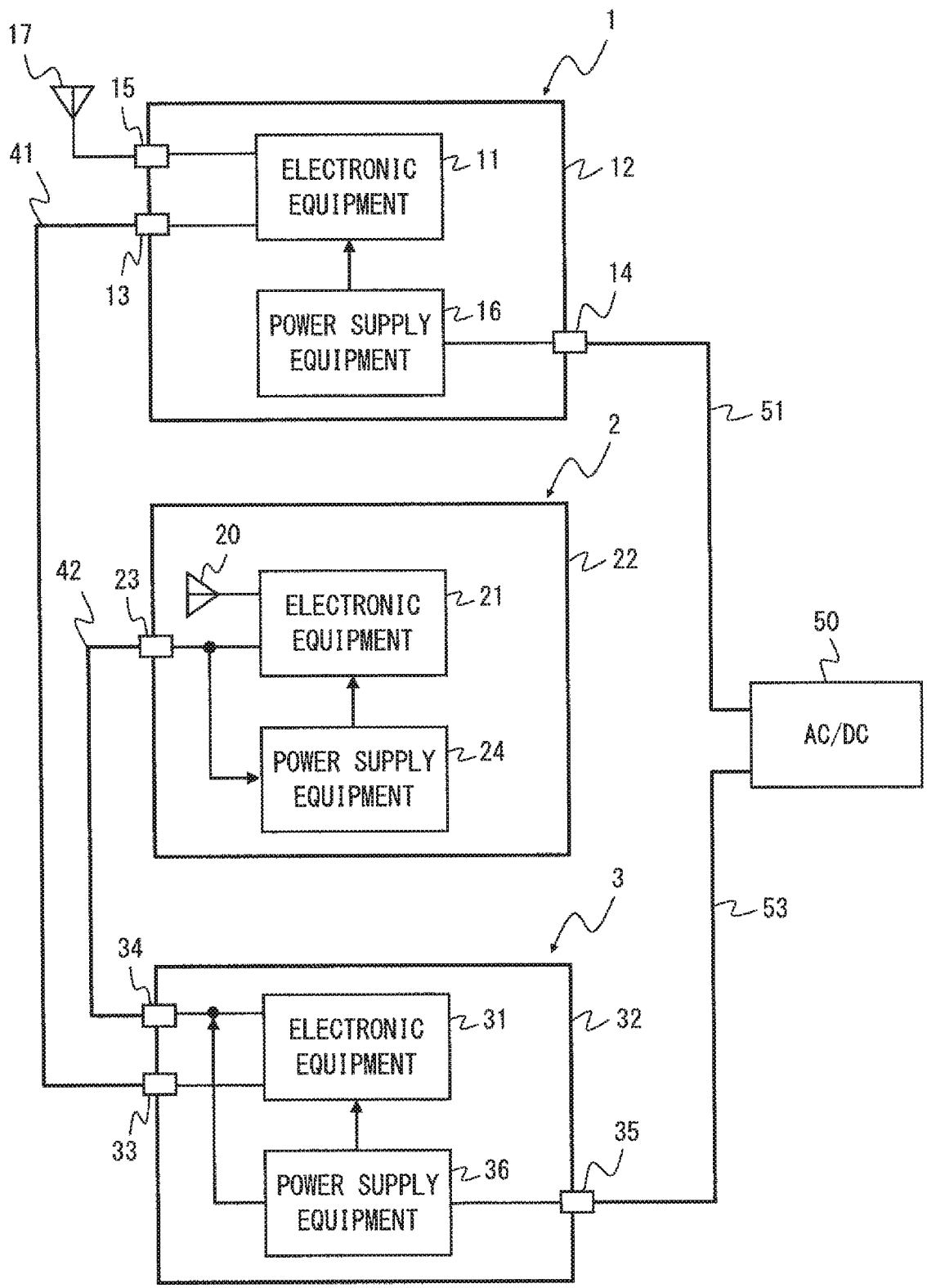
FIG. 2 is a block diagram showing an internal structure example and connections of the base station system according to the first embodiment.

FIG. 1 is an external perspective view showing an external structure example and an installation example of a base station system according to this embodiment. FIG. 2 is a block diagram showing an internal structure example and connections of the base station system according to this embodiment.

The base station system includes a base station device 1, a wireless transmission device 2 and a data transfer device 3, each of which can be installed outdoors. The base station device 1 is, for example, a UTRAN base station (i.e., NodeB) or an E-UTRAN base station (eNB). The wireless transmission device 2 is, for example, a microwave or millimeter wave wireless transmission device. For example, the wireless transmission device 2 uses a carrier wave at a frequency of at least 20 GHz and achieves a transmission distance of at least 500 meters. Preferably, the wireless transmission device 2 uses the 25 GHz frequency band or 60 GHz frequency band and achieves a transmission speed of 19 Mbit/s bidirectionally and a transmission distance of about 1 kilometers to about 10 kilometers. The data transfer device 3 performs transfer of data packets or data flames (e.g., IP packets or MAC frames). The data transfer device 3 is, for example, a router, a layer-3 switch or a layer-2 switch. The base station device 1, the wireless transmission device 2 and the data transfer device 3 are configured so that they can be installed outdoors. Hereinafter, the structure of each of the base station device 1, the wireless transmission device 2 and the data transfer device 3 is described with reference to FIGS. 1 and 2.

The base station device 1 includes electronic equipment 11 and an enclosure 12 that accommodates the electronic equipment 11. The electronic equipment 11 functions as a base station that relays data between a plurality of mobile stations and a mobile backhaul network. The enclosure 12 accommodates the electronic equipment 11 and provides a degree of protection from water and dust ingress necessary for being installed outdoors.

The wireless transmission device 2 includes electronic equipment 21 and an enclosure 22 that accommodates the electronic equipment 21. The electronic equipment 21 functions as a radio station that performs wireless transmission with other device for connecting the base station device 1 to the mobile backhaul network. The other device may be a wireless transmission device that has a regenerative relay function or a non-regenerative relay function. The electronic equipment 21 has a back-end function and a front-end function. The back-end function typically includes digital signal processing at baseband. The front-end function typically includes analog signal processing at carrier frequencies (RF (Radio frequency) band). To be more specific, the back-end function includes channel coding and modulation/demodulation, and the front-end function includes frequency conversion and signal amplification. The enclosure 22 accommodates the electronic equipment 21 and provides a degree of protection from water and dust ingress necessary for being installed outdoors.

The data transfer device 3 includes electronic equipment 31 and an enclosure 32 that accommodates the electronic equipment 31. The electronic equipment 31 functions as a router or a switch that transfers data packets or data flames between the base station device 1 and the wireless transmission device 2. The enclosure 32 accommodates the electronic equipment 31 and provides a degree of protection from water and dust ingress necessary for being installed outdoors.

The degree of protection from water and dust ingress of each enclosures 12, 22 and 32 described above may be IP65 according to IEC 60529 defined by IEC (International Electrotechnical Commission), for example.

As described above, in this embodiment, the base station device 1, the wireless transmission device 2 and the data transfer device 3 are respectively accommodated in individual enclosures 12, 22 and 32, and provides a degree of protection from water and dust ingress necessary for being installed outdoors. Therefore, none of those three devices requires installation inside a building/shelter. Thus, there is no need to construct a building/shelter when installing the base station system according to this embodiment. The base station system according to this embodiment that does not require construction of a building/shelter can be expected to be widely used in areas and countries where there are many geographical constraints on construction of a building/shelter. Further, the base station system according to this embodiment can be expected to contribute to quick restoration of a mobile phone infrastructure in the event of an emergency such as an earthquake or a flood.

Further, the fact that there is no need to construct a building/shelter is effective also when the owners or administrators of the three devices 1 to 3 are different from one another. In the case where the owners or administrators of the three devices 1 to 3 are different, it is assumed that acquisition of use rights of the site to construct a building/shelter and sharing of the cost to construct a building/shelter can cause a problem. In this embodiment, such a problem rarely arises because a building/shelter is not needed.

Further, in this embodiment, the wireless transmission device 2 has a structure in which the electronic equipment 21 that serves as a radio station that performs wireless transmission with the other device is integrally housed in the enclosure 22. In other words, the wireless transmission device 2 has a structure in which the electronic equipment 21 having the front-end function and the back-end function are integrally housed in the enclosure 22. This eliminates the need for wiring operations to connect a front-end device and a back-end device when installing the base station system.

Hereinafter, another specific structure shown in the example of FIGS. 1 and 2 is described. Note that, the specific structure described below is merely one example of this embodiment and can be modified as appropriate.

In the structure example shown in FIGS. 1 and 2, the base station device 1, the wireless transmission device 2 and the data transfer device 3 are configured so that wiring operations necessary to start operation is completed by carrying out wiring to connection terminals (e.g., communication cable connection terminals and power supply cable connection terminals) exposed outside the enclosures 12, 22 and 32, without carrying out additional wiring to the electronic equipment 11, 21 and 31 respectively accommodated inside the enclosures 12, 22 and 32, in the installation locations of those three devices. In other words, the base station device 1, the wireless transmission device 2 and the data transfer device 3 are configured so that wiring operations is completed only by external wiring to the enclosures 12, 22 and 32. There is thus no need to open the enclosures 12, 22 and 32 while carrying out wiring operations in the installation work of the base station device 1, the wireless transmission device 2 and the data transfer device 3. It is thereby possible to reduce the load of wiring operations necessary for installing the base station system. Further, there is a possibility that operations that involve opening the enclosures 12, 22 and 32 cause degradation of dustproof and waterproof capabilities due to the loss of airtightness of the enclosures. On the other hand, those issues can be avoided in this embodiment.

As shown in FIGS. 1 and 2, the enclosure 12 of the base station device 1 may be provided with a connection terminal 13 for a communication cable 41 that connects between the electronic equipment 11 and the data transfer device 3 to allow communication. The enclosure 22 of the wireless transmission device 2 may be provided with a connection terminal 23 for a communication cable 42. The communication cable 42 connects between the electronic equipment 21 and the data transfer device 3 to allow communication and supplies the operating power of the electronic equipment 21 from the data transfer device 3. The enclosure 32 of the data transfer device 3 may be provided with connection terminals 33 and 34 for the communication cable 41 and 42 respectively. Thus, in the example of FIGS. 1 and 2, the communication cable 42 is used in common for communication of the wireless transmission device 2 and power supply to the wireless transmission device 2. The power supply may be done by PoE (Power over Ethernet), for example. It is thereby possible to reduce the number of cables necessary for the installation of the wireless transmission device 2. Particularly, because microwaves and millimeter waves have a high rectilinear propagation property, the wireless transmission device 2 that uses them as carrier waves needs to be used in the state where there are few obstacles and a sufficient line-of-sight is afforded between the wireless transmission device 2 and the other device. Therefore, the wireless transmission device 2 needs to be installed in the higher position than the other two devices (the base station device 1 and the data transfer device 3). Accordingly, a relatively long cable is required for power supply and communication of the wireless transmission device 2, and therefore the effect of using the communication cable 42 for both communication and power supply as described in this embodiment is significant.

As shown in FIGS. 1 and 2, the enclosure 12 of the base station device 1 may be provided with an antenna connection terminal 15 for connection with an antenna 17. The antenna 17 is an antenna for a base station that is mounted outside the enclosure 12.

As shown in FIG. 1, the base station device 1, the wireless transmission device 2 and the data transfer device 3 may be configured so that they can be mounted on a wall surface or a pole surface with use of mounting members 61 to 63. In the example of FIG. 1, the three devices 1 to 3 are mounted on a cylindrical pole surface 71. Since all of those three devices 1 to 3 can be mounted on a wall surface or a pole surface, flexibility in the installation of the base station system is enhanced. Note that, although the example of FIG. 1 shows the layout where the three devices 1 to 3 are mounted on one pole surface 71 in close proximity to one another, this layout is merely one example. For example, only the wireless transmission device 2 may be mounted on the pole surface 71 and the base station device 1 and the data transfer device 3 may be mounted on other places (e.g., on the outer wall surface of a building).

As shown in FIG. 1, the enclosures 12, 22 and 32 may be portable. This facilitates a change in the installation location of the base station device 1, the wireless transmission device 2 and the data transfer device 3.

As shown in FIGS. 1 and 2, the wireless transmission device 2 may be in an integrated and compact structure where not only the electronic equipment 21 but also an antenna 20 is accommodated in the enclosure 22. This allows connections between the antenna 20 and the electronic equipment 21 to be made before shipment of the wireless transmission device 2. It is thereby possible to reduce the load of wiring operations necessary for installing the wireless transmission device 2. Further, operations for mounting an antenna on a wireless device (e.g., a front-end device (ODU)) and adjusting a direction of the antenna at a height such as a steel tower take time and are at high risk. With the wireless transmission device 2 having an integrated and compact structure where the antenna 20 is also accommodated in the enclosure 22, it is expected to reduce the workload necessary for antenna direction adjustment.

As shown in FIG. 1, it is preferred that the shapes of the communication cable connection terminals 13, 23, 33 and 34 of the three devices 1 to 3 are all the same. It can be a burden on a worker if different kinds of connection terminals coexist in one work place. With the same shape of the connection terminals 13, 23, 33 and 34, it is expected to improve the efficiency of wiring operations.

As shown in FIGS. 1 and 2, the enclosure 32 of the data transfer device 3 may be provided with a connection terminal 35 to which a power supply cable 53 for receiving power from an AC or DC external power supply is connected. Further, as shown in FIG. 2, the data transfer device 3 may include power supply equipment 36 that is accommodated in the enclosure 32. The power supply equipment 36 receives power from the external power supply, supplies operating power to the electronic equipment 31, and also supplies DC voltage to the communication cable 42. In the example of FIG. 2, the data transfer device 3 (the power supply equipment 36) receives DC voltage (e.g., −48V) that is supplied from an external AC/DC converter 50. The AC/DC converter 50 converts AC voltage (e.g., AC200V) to DC voltage (e.g., −48V) and outputs it. Further, as shown in FIG. 2, the wireless transmission device 2 may include power supply equipment 24 that is accommodated in the enclosure 22, receives DC voltage (e.g., −48V) via the communication cable 42 and supplies operating power to the electronic equipment 21.

As shown in FIGS. 1 and 2, the enclosure 12 of the base station device 1 may be provided with a connection terminal 14 to which a power supply cable 51 for receiving power from an AC or DC external power supply is connected. Further, as shown in FIG. 2, the base station device 1 may include power supply equipment 16 that is accommodated in the enclosure 12, receives power from the external power supply and supplies operating power to the electronic equipment 11. In the example of FIG. 2, the base station device 1 (the power supply equipment 16) receives DC voltage (e.g., −48V) supplied from the external AC/DC converter 50.

In the structure examples of FIGS. 1 and 2, the base station device 1 has the integrated and compact structure where the electronic equipment 11 and the power supply equipment 16 are accommodated in the enclosure 12 that can be installed outdoors. Further, the wireless transmission device 2 has the integrated and compact structure where the antenna 20, the electronic equipment 21 and the power supply equipment 24 are accommodated in the enclosure 22 that can be installed outdoors. Furthermore, the data transfer device 3 has the integrated and compact structure where the electronic equipment 31 and the power supply equipment 36 are accommodated in the enclosure 32 that can be installed outdoors. The devices 1 to 3 do not require internal wiring operations involving opening the enclosures during the installation work. That is, in the structure example of FIGS. 1 and 2, each of the devices 1 to 3 can be installed outdoors, is integrally housed in each enclosure, has compact structure, and is configured so that the installation work of the base station system can be completed by cable connections between those devices. Thus, the base station system shown in the structure example of FIGS. 1 and 2 provides the mobile backhaul network that is highly resistant to environmental conditions and easily installable because the devices 1 to 3 have functions in cooperation with one another to make a connection with the mobile backhaul network.

<Second Embodiment>

Figure 3:
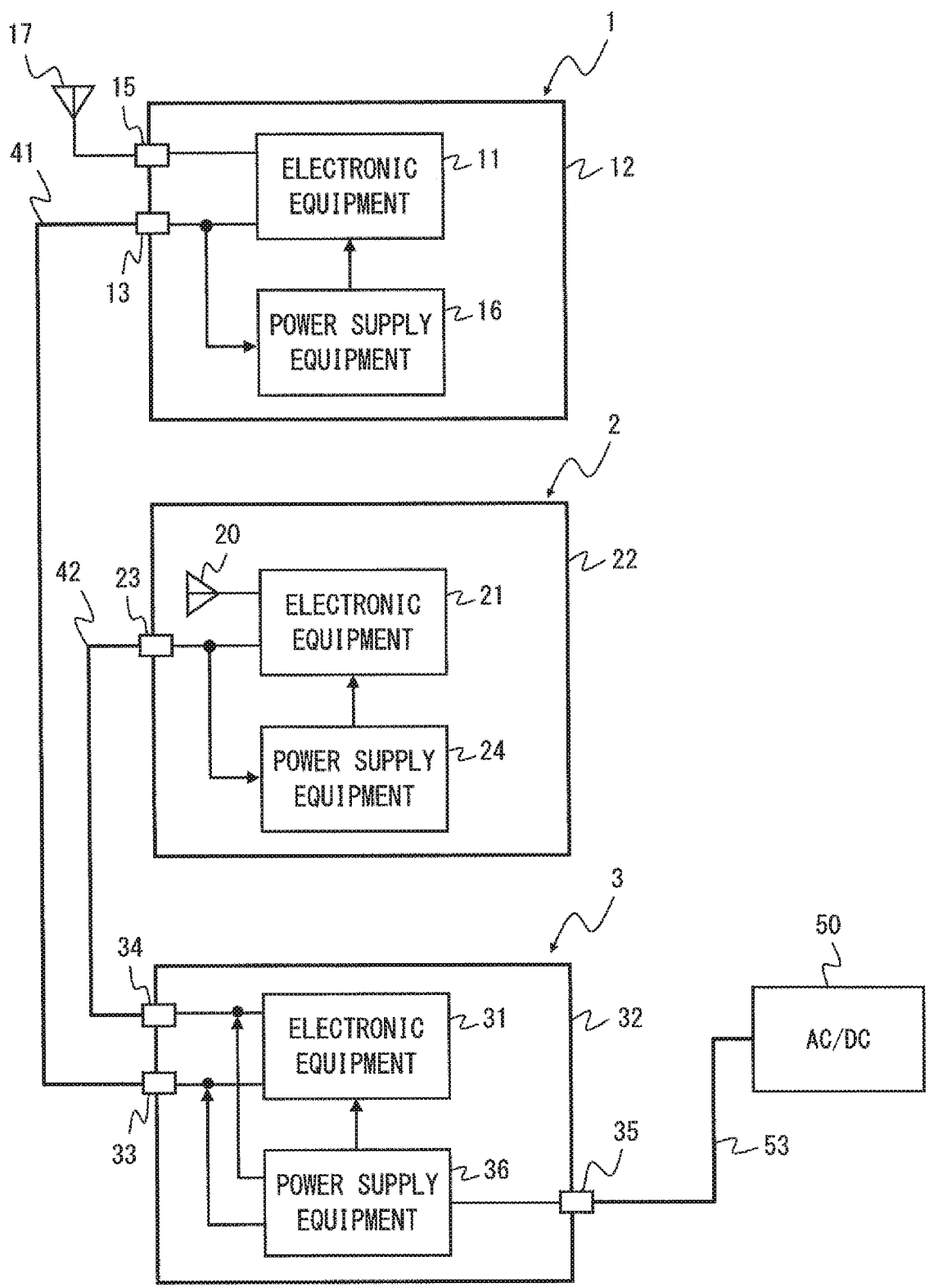
FIG. 3 is a block diagram showing an internal structure example and connections of a base station system according to a second embodiment.

The first embodiment describes the specific example in which the base station device 1 receives power from an external power supply through the power supply cable connection terminal 14 that is different from the communication cable connection terminal 13. However, the base station device 1 may operate with power that is supplied from the data transfer device 3 using the communication cable 41, just like the wireless transmission device 2. The power supply may be done by PoE (Power over Ethernet), for example. To be more specific, as shown in FIG. 3, the power supply equipment 36 of the data transfer device 3 supplies DC voltage (e.g., −48V) to the communication cable 42. Then, the power supply equipment 16 of the base station device 1 receives the DC voltage (e.g., −48V) via the communication cable 41 and supplies operating power to the electronic equipment 11. This structure eliminates the need for wiring operations of a power supply cable to the base station device 1, thereby reducing the load of wiring operations and facilitating the installation of the base station system including the devices 1 to 3.

<Other Embodiments>

The first and second embodiments describe the example in which each of the communication cables 41 and 42 (e.g., STP (Shielded Twisted Pair) cables) is used in common for communication and power supply. However, a power supply cable may be used in common for communication and power supply. Specifically, a power supply cable that connects the data transfer device 3 with the wireless transmission device 2 for power supply to the wireless transmission device 2 may be used also for communication between the data transfer device 3 and the wireless transmission device 2.

The first and second embodiments describe the example in which one base station device 1 and one wireless transmission device 2 are used. However, in the case where, for example, there is high traffic demand in the installation location of the base station system, a plurality of base station devices 1 may be installed. In this case, one wireless transmission device 2 may be used for connecting the plurality of base station devices 1 to the mobile backhaul network. Note that multiplexing of the traffic related to the plurality of base station devices 1 may be performed by packet (frame) multiplexing in the data transfer device 3 or may be performed using the multiplexing function of the wireless transmission device 2. Further, in the case where, for example, the connection with the mobile backhaul network is made redundant or the base station system further relays the traffic of a base station installed in another location, a plurality of wireless transmission devices 2 may be installed.

Although the base station device 1 and the data transfer device 3 are connected only through one communication cable 42 in the example of FIGS. 1 and 2, those devices may be connected through a plurality of communication cables. Likewise, the wireless transmission device 2 and the data transfer device 3 may be connected through a plurality of communication cables.

Further, the invention is not limited to the embodiments described above, and it will be obvious that various modifications may be made therein without departing from the spirit and scope of the present invention described above.

This application is based upon and claims the benefit of priority from Japanese patent application No. 2012-027177, filed on Feb. 10, 2012, the disclosure of which is incorporated herein in its entirety by reference.

REFERENCE SIGNS LIST

1 BASE STATION DEVICE
2 WIRELESS TRANSMISSION DEVICE
3 DATA TRANSFER DEVICE
11 ELECTRONIC EQUIPMENT OF BASE STATION
12 ENCLOSURE
13 COMMUNICATION CABLE CONNECTION TERMINAL
14 POWER SUPPLY CABLE CONNECTION TERMINAL
15 ANTENNA CONNECTION TERMINAL
16 POWER SUPPLY EQUIPMENT
17 ANTENNA
20 ANTENNA
21 ELECTRONIC EQUIPMENT OF WIRELESS TRANSMISSION DEVICE
22 ENCLOSURE
23 COMMUNICATION CABLE TERMINAL
24 POWER SUPPLY EQUIPMENT
31 ELECTRONIC EQUIPMENT OF DATA TRANSFER DEVICE
32 ENCLOSURE
33 COMMUNICATION CABLE CONNECTION TERMINAL
34 COMMUNICATION CABLE CONNECTION TERMINAL

35 POWER SUPPLY CABLE CONNECTION TERMINAL
36 POWER SUPPLY EQUIPMENT
41 COMMUNICATION CABLE
42 COMMUNICATION CABLE
50 AC/DC CONVERTER
51 POWER SUPPLY CABLE
53 POWER SUPPLY CABLE
61 MOUNTING MEMBER
62 MOUNTING MEMBER
63 MOUNTING MEMBER
71 POLE

The invention claimed is:

1. A system configured to be connected to a mobile backhaul network, the system comprising a data transfer device and a plurality of wireless transmission devices: wherein
the data transfer device is configured to receive information from a base station device, is configured to transfer the information to the plurality of wireless transmission devices, is installed outdoors, and has a first enclosure to protect the data transfer device from ingress of at least one of water and dust, the data transfer device is configured to function as a router or a switch; and
each wireless transmission device is configured to receive the information from the data transfer device, is installed outdoors, and has a second enclosure to protect the wireless transmission device from ingress of at least one of water and dust, each wireless transmission device is configured to function as a radio station to connect the system to the mobile backhaul network.

2. The system according to claim 1, wherein the first enclosure has a first cable interface to provide the data transfer device with a wired connection to the base station device outside the first enclosure and has a second cable interface to provide the data transfer device with a wired connection to each wireless transmission device outside the first enclosure.

3. The system according to claim 1, wherein one or both of the data transfer device and the plurality of wireless transmission devices further include one or more connection terminals respectively outside the enclosures for respectively connecting wiring of one or both of the data transfer device and the plurality of wireless transmission devices to operate the system, such that the wiring is outside of the enclosures.

4. The system according to claim 3, wherein the data transfer device and the plurality of wireless transmission devices are configured to allow the wiring to be completed without opening the enclosures.

5. The system according to claim 1, wherein the enclosures are configured to be mounted on a wall surface or a pole surface with use of mounting members.

6. The system according to claim 1, wherein each of the data transfer device and the plurality of wireless transmission devices is portable.

7. The system according to claim 1, wherein each wireless transmission device further includes an antenna accommodated in the second enclosure of the wireless transmission device, connected to an internal equipment of the wireless transmission device, and used for wireless transmission.

8. The system according to claim 1, one or both of the data transfer device and the plurality of wireless transmission devices provide protection corresponding to at least IP65 according to IEC 60529 defined by IEC (International Electrotechnical Commission).

9. The system according to claim 1, wherein the data transfer device is configured to supply operating power to each wireless transmission device via a cable.

10. The system according to claim 9, wherein the cable is also used for data communication.

11. The system according to claim 9, wherein the data transfer device further includes a power supply equipment which receives power from a DC or AC external power supply, and supplies operating power to the plurality of wireless transmission devices.

12. The system according to claim 1, each of the enclosures provides a degree of protection from water and dust ingress necessary for being installed outdoors.

13. The system according to claim 9, wherein the data transfer device is configured to supply operating power of each wireless transmission device via the cable by using a Power over Ethernet.

14. A method comprising:
mounting a data transfer device and a plurality of wireless transmission devices on a wall or a pole via one or more mounting members,
the data transfer device being configured to receive information from a base station device, being configured to transfer the information to the plurality of wireless transmission devices, being configured to be installed outdoors, and having a first enclosure to protect the data transfer device from ingress of at least one of water and dust, the data transfer device being configured to function as a router or a switch,
each wireless transmission device being configured to receive the information from the data transfer device, being configured to be installed outdoors, and having a second enclosure to protect the wireless transmission device from ingress of at least one of water and dust, each wireless transmission device being configured to function as a radio station to connect a system including the data transfer device and the plurality of wireless transmission devices to a mobile backhaul network;
connecting the data transfer device via a first communication cable to the base station device outside the first enclosure; and
connecting the data transfer device via a second communication cable to each wireless transmission device outside the first enclosure.

15. The method according to claim 14, wherein the mounting comprises mounting the data transfer device on the same wall or the same pole as the plurality of wireless transmission devices.

16. The method according to claim 14, wherein the mobile backhaul network includes a core network.

* * * * *